United States Patent
Jin et al.

(10) Patent No.: US 8,472,295 B1
(45) Date of Patent: Jun. 25, 2013

(54) SELECTIVE ERROR PROTECTION OVER MULTIPLE SECTORS

(71) Applicant: LSI Corporation, Milpitas, CA (US)

(72) Inventors: Ming Jin, Fremont, CA (US); Jun Xiao, Fremont, CA (US); Fan Zhang, Milpitas, CA (US); Haitao Xia, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/646,386

(22) Filed: Oct. 5, 2012

(51) Int. Cl.
*G11B 7/00* (2006.01)
*G11B 5/09* (2006.01)

(52) U.S. Cl.
USPC ............... 369/53.15; 369/53.16; 369/53.42; 360/53

(58) Field of Classification Search
None
See application file for complete search history.

(56) References Cited

U.S. PATENT DOCUMENTS

| | | | |
|---|---|---|---|
| 5,392,290 A | 2/1995 | Brown et al. | |
| 5,701,304 A | 12/1997 | Glover et al. | |
| 5,974,544 A * | 10/1999 | Jeffries et al. | 713/1 |
| 6,304,986 B1 * | 10/2001 | Ma et al. | 714/718 |
| 6,891,690 B2 | 5/2005 | Asano et al. | |
| 7,178,086 B2 * | 2/2007 | Hassner et al. | 714/758 |
| 2003/0051201 A1 | 3/2003 | Brenna | |

* cited by examiner

*Primary Examiner* — Muhammad N Edun
(74) *Attorney, Agent, or Firm* — Suiter Swantz pc llo

(57) ABSTRACT

The present disclosure is directed to selectively protecting a portion of a track including a plurality of data sectors. The data sectors include a plurality of user sectors and one or more parity sectors. Protected bits are designated in each of the of data sectors. The protected bits are selected to have matching bit indices across the data sectors resulting in a parallel alignment of the protected bits across the user and parity sectors. One or more selections of protected bits of the user sectors are encoded across matching bit indices to generate data values in the corresponding protected bits of the parity sectors. At least one portion of at least one failed sector is recoverable by decoding at least one selection of the protected bits when a sector error occurs at a protected bit.

20 Claims, 5 Drawing Sheets

US 8,472,295 B1

SELECTIVE ERROR PROTECTION OVER MULTIPLE SECTORS

BACKGROUND

In modern data storage systems, information is commonly stored on one or more data storage devices, such as, but not limited to, optical, magnetic, or solid-state disks. Each disk typically includes one or more tracks having a plurality of sectors. For example, a typical track includes 1000 or more 512 byte sectors or 250 or more 4 kilobyte sectors. Errors can occur in any of the sectors at any given time due to noise or malicious interference. However, certain portions of a sector are often known to exhibit higher error rates than other portions of the sector.

SUMMARY

An embodiment of the disclosure is a system for recovering at least a portion of a failed sector of a disk track including at least n sectors configured for storing data. The system includes an error protection module in communication with the at least n sectors of the disk track. The at least n sectors include k user sectors and n–k parity sectors. The at least n sectors further include a plurality of protected bits. In some embodiments, protected bits include at least one of selected bits or bits having a determined error rate. The error protection module is configured to encode the protected bits across the k user sectors to generate n sectors of data including the k user sectors and the n–k parity sectors. The error protection module is further configured to detect one or more sector errors of the n sectors, wherein a failed sector includes a sector having a sector error. The error protection module is further configured to recover at least one portion of at least one failed sector by decoding the protected bits.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
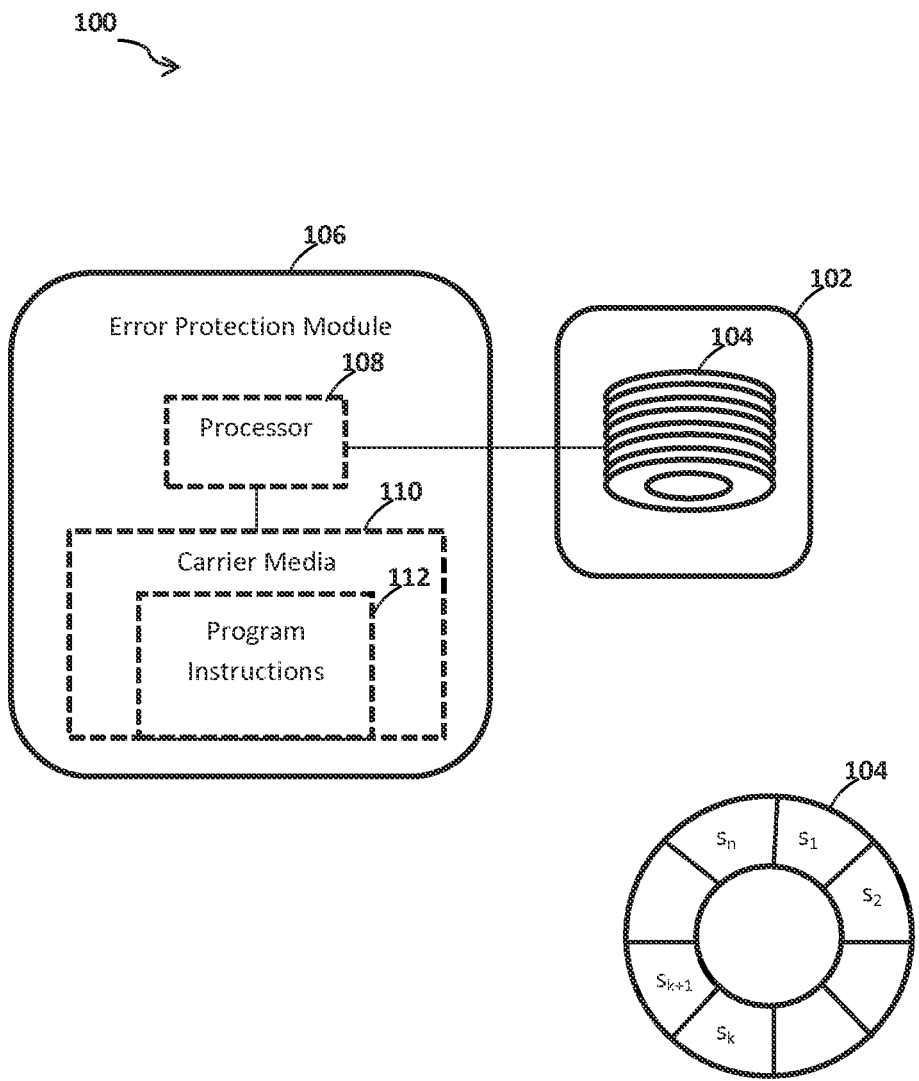
FIG. 1 is a block diagram illustrating a system for recovering at least one portion of at least one failed sector of a plurality of sectors of a disk track, in accordance with an embodiment of the disclosure.
Figure 2A:
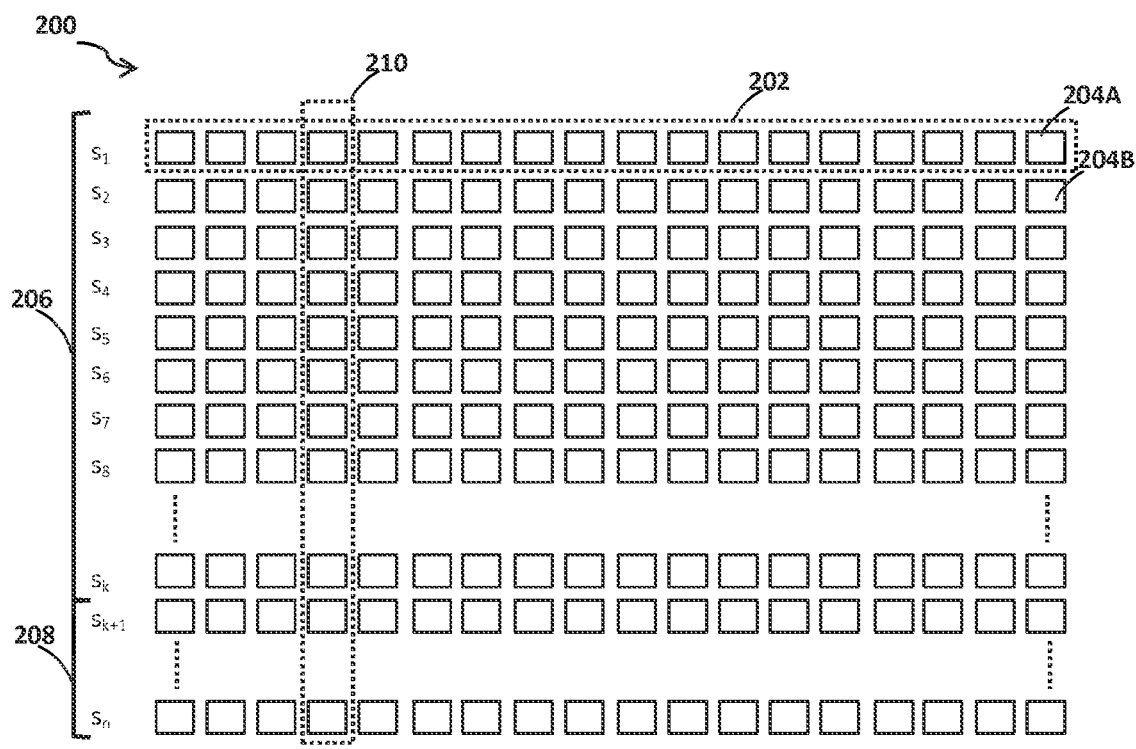
FIG. 2A is a block diagram illustrating a track of sectors including at least one selection of protected bits, wherein the track includes a plurality of user sectors and at least one parity sector, in accordance with an embodiment of the disclosure.
Figure 2B:
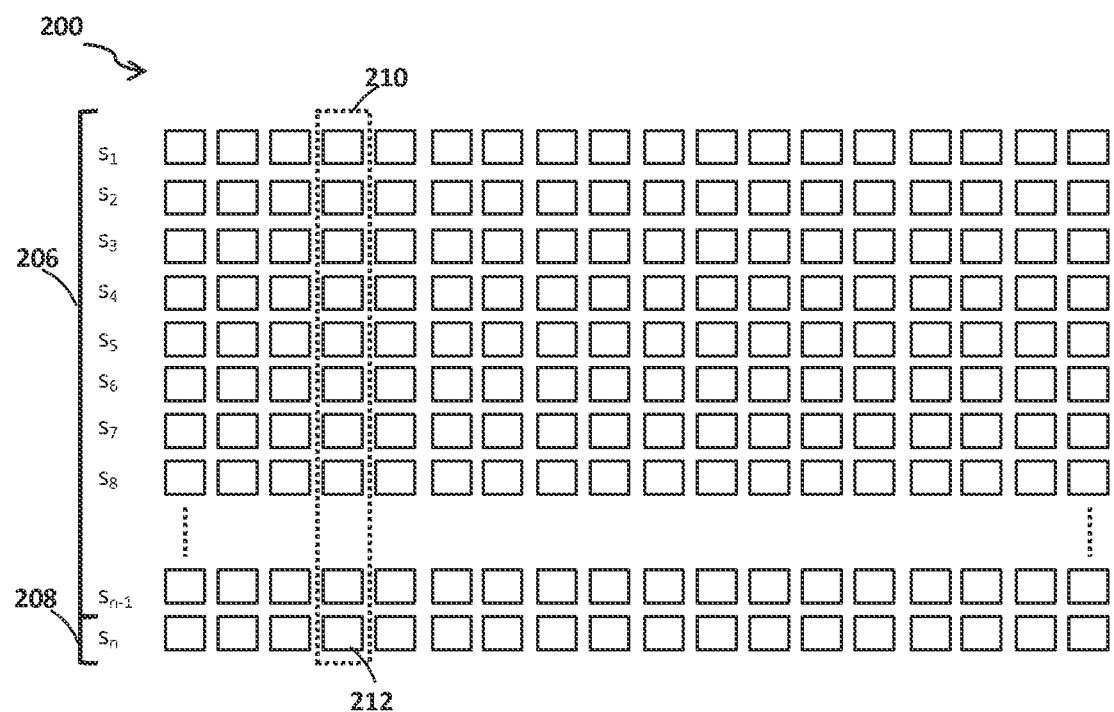
FIG. 2B is a block diagram illustrating a track of sectors including at least one selection of protected bits, wherein the track includes a plurality of user sectors and one parity sector, in accordance with an embodiment of the disclosure.
Figure 2C:
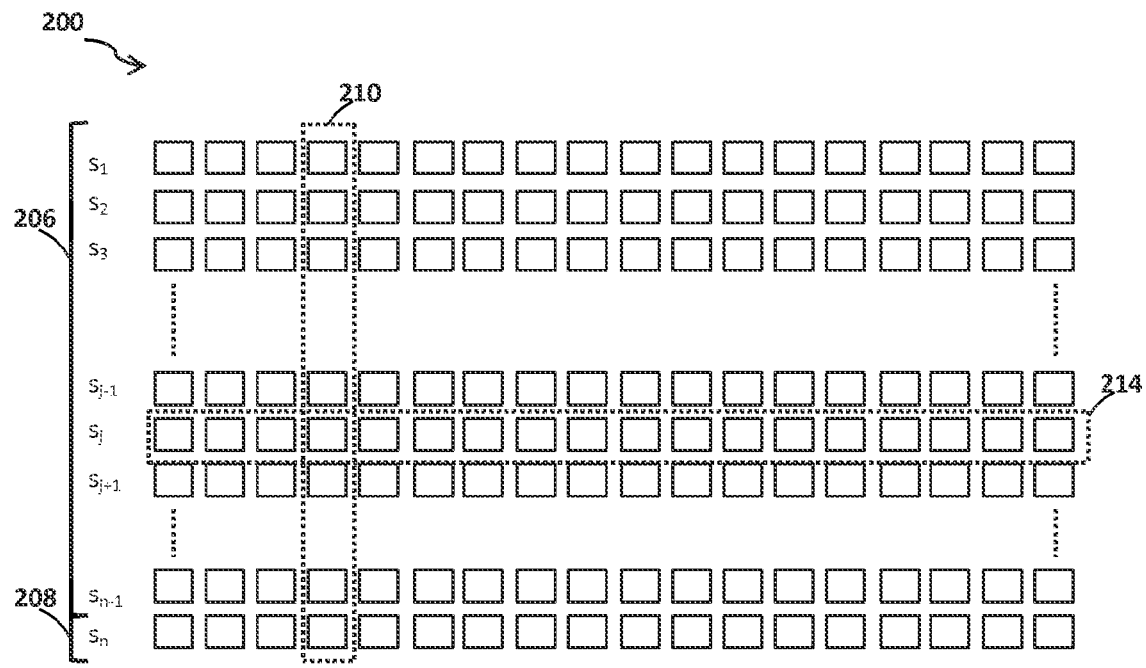
FIG. 2C is a block diagram illustrating a track of sectors including at least one selection of protected bits, wherein the track includes a plurality of user sectors and one parity sector, wherein a failed sector of the track is illustrated, in accordance with an embodiment of the disclosure.
Figure 3:
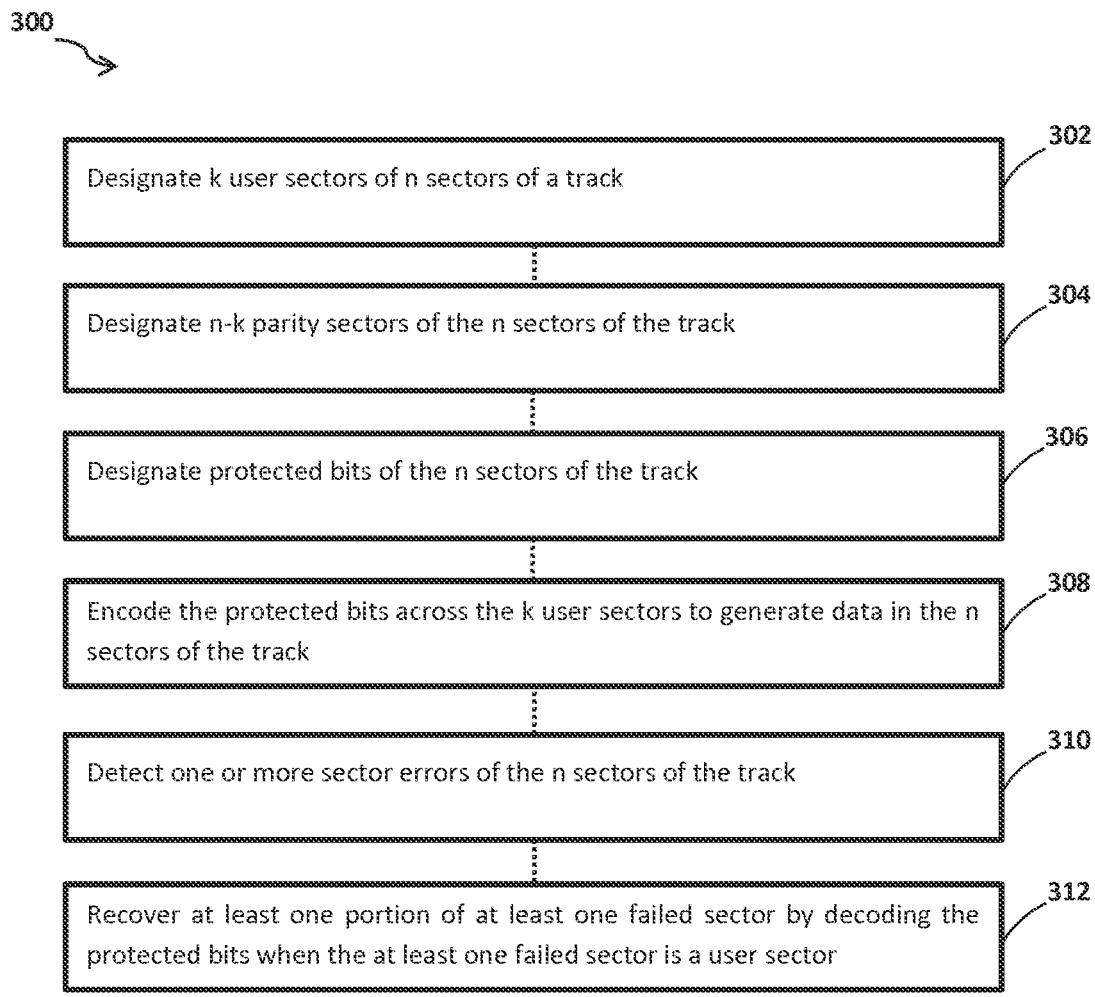
FIG. 3 is a flow diagram illustrating a method for recovering at least one portion of at least one failed sector of a plurality of sectors of a disk track, in accordance with an embodiment of the disclosure.

FIGS. 1 through 3 generally illustrate a system and method for protecting one or more selected portions of a track by coding over a plurality of bits across multiple data sectors of the track. Data storage systems include one or more storage devices (hereinafter "disk" or "disks) configured for storing information. Each disk includes one or more tracks including a plurality of sectors configured to store data permanently, semi-permanently, or temporarily. A sector is configured to store information utilizing a plurality of bits configured to hold Boolean values (i.e. "1" or "0"). Sector errors due to noise or malicious interference result in improper values at one or more bits in one or more sectors of a track.

A failed sector or a sector in error is a sector having erroneous values at one or more bits. Error protection schemes are known for recovering failed sectors. However, sector recovery typically imposes a relatively high processing burden. A selective protection scheme is provided to protect portions of a track having higher error rates than other portions of the track. Protecting one or more selected portions of the track rather than extending protection to the entirety of the track allows for adequate protection at lower rate penalty than full track or full sector error protection.

FIG. 1 illustrates an embodiment of a system 100 configured to protect a selected portion of a plurality of sectors by coding over a selection of protected bits spanning the plurality of sectors. The system 100 includes one or more disks 102 having one or more tracks 104 configured for storing information in an array of sectors. A track 104 includes at least n sectors; where n can be any arbitrary integer. One or more user sectors (e.g. $s_1, s_2, \ldots s_k$) of the track 104 are configured for storing user information, such as any data intended for storage or transmission. In addition, one or more parity sectors (e.g. $s_{k+1}, s_{k+2}, \ldots s_n$) of the track 104 are configured for storing data associated with an encoded portion of the user sectors of the track 104.

The system 100 further includes an error protection module 106 in communication with the plurality of sectors of the track 104. While the embodiments herein are primarily directed to protecting a portion of a plurality of sectors in a single track 104, it should be understood that any of the systems, methods, or concepts discussed herein may be embodied in a multiple-track or multiple-disk system. In some embodiments, the error protection module 106 is in communication with a plurality of disks or tracks. In other embodiments, each of a plurality of error protection modules 106 is in communication with one or more designated disks or designated tracks.

The error protection module 106 includes at least one of software, hardware, or firmware configured for executing program instructions to selectively protect at least one portion of the plurality of sectors of the track 104. In one embodiment, the error protection module 106 includes a computing system having at least one processor 108 configured to execute program instructions 112 from carrier media 110. In one embodiment, the error protection module 106 is located partially or entirely on the disk 102, such that the disk 102 includes an onboard error protection module 106 in communication with one or more tracks 104 of the disk 102. In another embodiment, the error protection module 106 includes one or more communicatively coupled components or systems, such as, but not limited to, one or more computing systems in communication with one or more disks 102, as illustrated in FIG. 1.

In an embodiment illustrated in FIG. 2A, the error protection module 106 is in communication with at least n data sectors 200 of the track 102. The error protection module 106 is configured to designate user sectors 206 and parity sectors 208 of the data sectors 200. In one embodiment, the error protection module 106 is configured to designate k user sectors 206; where k is any integer value less than n. The error protection module 106 is further configured to designate n−k parity sectors 208 so that a total of n data sectors 200 are designated as either user 206 or parity sectors 208. In some embodiments, the error protection module 106 is configured to designate sectors as user 206 or parity sectors 208 in response to one or more user commands. In other embodiments, the error protection module 106 is configured to designate at least one of user 206 or parity sectors 208 in response to storage system or disk characteristics or preprogrammed instructions.

Each sector 202 of the n data sectors 200 includes a plurality of bits 204 configured to hold a Boolean value. In one embodiment, a first bit 204A of a first sector has a parallel alignment to a second bit 204B of a second sector having the same bit index. In some embodiments, a portion of a sector 202, such as one or more bits 204 of the sector 202, exhibits higher error rates than the remainder of the sector 202. Selectively protecting the error prone portion of the sector 202 allows for adequate sector protection at a lower rate penalty than error protection over the entire sector. The selective protection scheme provides a greater advantage when the n data sectors 200 include two or more sectors having similar error-prone portions allowing a selection of protected bits 210 spanning the parallel error-prone portions of the n data sectors 200 to protect the two or more sectors simultaneously.

The error protection module 106 is further configured to designate one or more selections of protected bits 210 of the n data sectors 200. In an embodiment, the error protection module 106 is further configured to designate the protected bits 210 in response to one or more user commands. In another embodiment, the error protection module 106 is configured to designate the protected bits 210 of the n data sectors 200 in response to storage system or disk characteristics or preprogrammed instructions. In yet another embodiment, the error protection module 106 is configured to detect sector errors occurring over a desired time interval, such as a predetermined time interval or until a predetermined number of errors are detected. The error protection module 106 is configured to determine one or more error-prone bits of at least one sector 202 of the n data sectors 200 of the track 104 having detected sector errors. The error protection module 106 is configured to designate protected bits 210 of the n data sectors 200 utilizing information associated with the error-prone bits.

In one embodiment, the protected bits 210 include a plurality of bits having the same bit indices. In another embodiment, the protected bits 210 include at least one bit from each sector 202 of the n data sectors 200. In yet another embodiment, the protected bits 210 include a plurality of contiguous or noncontiguous bits from each of the n data sectors 200. In yet another embodiment, the a first plurality of protected bits 210 from a first sector 202 of the n data sectors 200 have the same bit indices as a second plurality of protected bits 210 of a second sector of the n data sectors 200, and so on. Whether the protected bits 210 include one or more bits from each sector a parallel alignment allows the protected bits 210 to be coded over the full span of the n sectors 200 utilizing codewords aligned with the one or more bit indices of the protected bits 210.

In another embodiment, the error protection module 106 does not necessarily designate at least one of the user sectors 206, parity sectors 208, or protected bits 210. At least one of the user sectors 206, parity sectors 208, or protected bits 210 is determined by hardware, software, or firmware on the disk 102 or by a separate computing system. Regardless of how the user sectors 206, parity sectors 208, or protected bits 210 are determined; the error protection module 106 configured for communicating with and treating the user sectors 206, parity sectors 208, and protected bits 210 as such.

The error protection module 106 is further configured to encode the protected bits 210 of the k user sectors 206 over one or more bit indices to generate values for the protected bits 210 of the n−k parity sectors. The error protection module 106 is configured to generate data in all n sectors 200 by encoding the protected bits 210 of the k user sectors 206. In some embodiments, the error protection module 106 is configured to encode the protected bits 210 of the k user sectors 206 utilizing maximum distance separable (MDS) coding to allow for error correcting capability. In some embodiments, the error protection module 106 is configured to recover up to $\text{floor}[(n-k+1)/2]$ errors as long when errors occur at the protected bits 210; where $\text{floor}[(n-k+1)/2]$ is the largest integer value not greater than $(n-k+1)/2$. In one embodiment, each MDS codeword spans across the protected bits 210 of the n data sectors 200 to enable recovery of the protected bits 210 in a failed sector of the k user sectors 206 or the n−k parity sectors 208.

The error protection module 106 is further configured to detect sector errors utilizing any error detection systems known to the art, including but not limited to error correction coding, cyclic redundancy coding, parity checks, checksums, low-density parity-check (LDPC) coding. In one embodiment, the error protection module 106 is further configured to indicate the absence of errors in the k user sectors 206. In another embodiment, the error protection module 106 is configured to take no action when no sector errors are detected in the k user sectors 206. The error protection module 106 is configured to initiate a recovery sequence when at least one sector error is detected in at least one failed sector of the k user sectors 206. The error protection module 106 is configured to decode the protected bits 210 of the n data sectors 200 to recover at least a portion of the failed sector. The error protection module 106 is configured to correct up to $\text{floor}[(n-k+1)/2]$ errors occurring at the protected bits 210. The error protection module 106 is further configured to recover up to $\text{floor}[(n-k+1)/2]$ failed sectors of the k user sectors 206 or the n−k parity sectors 208 when the sector errors occur at the protected bits 210.

Some embodiments require recovery of a single sector, since it is rare to experience more than one failed sector at a time under typical operational SNR conditions. FIGS. 2B and 2C illustrate an embodiment of the system 100 configured for recovering at least one portion of a failed sector of the n data sectors 200. In a single sector recovery scheme, the n data sectors 200 include n−1 user sectors 206 and one parity sector 208. The error protection module 106 is configured to code over the protected bits 210 of the n−1 user sectors 206 to generate values for the one or more protected bits 210 of the parity sector 208.

The error protection module 106 encodes the protected bits 210 of the n−1 user sectors 206 utilizing MDS codes. In one embodiment, the MDS coding includes determining bitwise sums of the protected bits 210 across one or more corresponding bit indices of the n−1 user sectors 206. In one embodiment, the bitwise sum includes an exclusive-or (XOR) operation of the protected bits 210 having matching indices of the n−1 user sectors 206. The error protection module 106 is configured to set one or more protected parity bits 212 of the parity sector 208 equivalent to the bitwise sum of the corresponding protected bits 210 of the n−1 user bits 206 having the same bit indices. The bitwise sum of each selection of protected bits 210 of the n data sectors 200 having matching bit indices is equal to zero when there are no sector errors.

The error protection module 106 is further configured to utilize a bitwise sum to decode the protected bits 210 to recover at least a portion of a failed sector 214 when at least one sector error is detected. The error protection module 106 is configured recover at least a portion of the failed sector 214 (e.g. $s_j$) by computing the bitwise sum across protected bits 210 of all other sectors (e.g. $s_1, \ldots s_{j-1}$ and $s_{j+1}, \ldots s_n$) of the n data sectors 200. The error protection module 106 is further configured to determine values of the protected bits 210 of the failed sector 214 utilizing the bitwise sum. The correct values for protected bits 210 of the failed sector 214 are equal to the bitwise sum of the protected bits 210 having matching indices taken across all other sectors of the n data sectors 200, such that the bitwise sum of the protected bits 210 having matching indices of all n data sectors 200 is zero. The error protection module 106 is configured to recover at least the protected portion of the failed sector 214 utilizing determined values of the protected bits 210 of the failed sector. The error protection module 106 is further capable of recovering an entire failed sector 214 when the failed sector has sector errors at protected bits of the failed sector 214.

It is noted herein that system 100 is an embodiment manifesting a method 300 of selectively protecting at least a portion of a track including a plurality of data sectors 200. In an embodiment illustrated by FIG. 3, the method 300 includes the following steps. In steps 302 through 306, k user sectors 206, n−k parity sectors 208, and protected bits 210 of n data sectors 200 of a track are designated by at least one of a user command, preprogrammed instructions, or based on system or device characteristics. In step 308, the protected bits 210 of the k user sectors 206 having matching bit indices are encoded to generate values in corresponding protected bits 210 of the n−k parity sectors. In step 310, one or more sector errors are detected utilizing any error detection algorithm known to the art. In step 312, at least one portion of a failed sector is recovered by decoding one or more selections of protected bits 210 having matching bit indices across the n sectors 200. In addition, it may be possible to fully recover failed sectors when there are no more than floor[(n−k+1)/2] failed sectors and sector errors occur at protected bits 210.

It should be recognized that in some embodiments the various steps described throughout the present disclosure may be carried out by a single computing system or multiple computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the foregoing disclosure.

What is claimed is:

1. A system for recovering at least one portion of at least one failed sector of a plurality of sectors of a disk track, comprising:
    an error protection module in communication with at least n sectors of a track configured for storing data, the at least n sectors including k user sectors, the at least n sectors further including n−k parity sectors, the at least n sectors further including a plurality of protected bits, the error protection module configured to:
        encode the protected bits across the k user sectors to generate n sectors of data including the k user sectors and the n−k parity sectors;
        detect one or more sector errors of the n sectors, wherein a sector having a sector error is a failed sector; and
        recover at least one portion of at least one failed sector by decoding the protected bits when the at least one failed sector is a user sector.

2. The system of claim 1, wherein the error protection module is further configured to encode the protected bits utilizing maximum distance separation (MDS) coding.

3. The system of claim 1, wherein the protected bits have the same bit indices across the k user sectors.

4. The system of claim 1, wherein the error protection module is further configured to recover the at least one portion of the at least one failed sector by decoding the protected bits when no more than floor[(n−k+1)/2] failed sectors are detected.

5. The system of claim 1, wherein the error protection module is further configured to recover the at least one portion of the at least one failed sector by decoding the protected bits when the one or more sector errors are detected at one or more of the protected bits.

6. The system of claim 1, wherein the error protection module is further configured to recover the at least one failed sector by decoding the protected bits when the at least one failed sector is a user sector, no more than floor[(n−k+1)/2] failed sectors are detected, and the one or more sector errors are detected at one or more of the protected bits.

7. A system for recovering at least one portion of a failed sector of a plurality of sectors of disk track, comprising:
   an error protection module in communication with n sectors of a track configured for storing data, the n sectors including n−1 user sectors, the n sectors further including a parity sector, the n sectors further including a plurality of protected bits, the error protection module configured to:
   determine a bitwise sum of the protected bits across the user sectors;
   generate at least one protected bit value of the parity sector utilizing the bitwise sum of the protected bits determined across the user sectors so that the bitwise sum of the protected bits determined across all of the n sectors is zero;
   detect one or more sector errors of the n sectors, wherein a sector having a sector error is a failed sector;
   determine a bitwise sum of the protected bits across a portion of the n sectors when a failed sector is detected, wherein the portion of the n sectors includes all of the n sectors except for the failed sector; and
   recover at least one portion of the failed sector utilizing the bitwise sum of the protected bits determined across the portion of the n sectors excluding the failed sector.

8. The system of claim 7, wherein the error protection module is further configured to encode the protected bits utilizing maximum distance separation (MDS) coding.

9. The system of claim 7, wherein the protected bits have the same bit indices across the n−1 user sectors.

10. The system of claim 7, wherein the error protection module is further configured to recover the at least one portion of the failed sector when one failed sector is detected.

11. The system of claim 7, wherein the error protection module is further configured to recover the at least one portion of the failed sector when the one or more sector errors are detected at one or more of the protected bits.

12. The system of claim 7, wherein the error protection module is further configured to recover the failed sector when one failed sector is detected and the one or more sector errors are detected at one or more of the protected bits.

13. A method of recovering at least one portion of at least one failed sector of a plurality of sectors of a disk track, comprising the steps of:
   designating k user sectors of at least n sectors of a track;
   designating n−k parity sectors of the at least n sectors;
   designating protected bits of the at least n sectors;
   encoding the protected bits across the k user sectors to generate n sectors of data including the k user sectors and the n−k parity sectors;
   detecting one or more sector errors of the n sectors, wherein a sector having a sector error is a failed sector; and
   recovering at least one portion of at least one failed sector by decoding the protected bits when the at least one failed sector is a user sector.

14. The method of claim 13, wherein the method further includes:
   encoding the protected bits utilizing maximum distance separation (MDS) coding.

15. The method of claim 13, wherein the protected bits have the same bit indices across the k user sectors.

16. The method of claim 13, wherein the method further includes:
   recovering the at least one portion of the at least one failed sector by decoding the protected bits when no more than floor[(n−k+1)/2] failed sectors are detected.

17. The method of claim 13, wherein the method further includes:
   recovering the at least one portion of the at least one failed sector by decoding the protected bits when the one or more sector errors are detected at one or more of the protected bits.

18. The method of claim 13, wherein the method further includes:
   recovering the at least one failed sector by decoding the protected bits when the at least one failed sector is a user sector, no more than floor[(n−k+1)/2] failed sectors are detected, and the one or more sector errors are detected at one or more of the protected bits.

19. The method of claim 13, wherein the method further includes:
   designating n−1 user sectors of n sectors of the track;
   designating a parity sector of the n sectors;
   designating protected bits of the n sectors;
   determining a bitwise sum of the protected bits across the user sectors;
   encoding the protected bits across the n−1 user sectors to generate n sectors of data including the n−1 user sectors and the parity sector by generating at least one protected bit value of the parity sector utilizing the bitwise sum of the protected bits determined across the user sectors so that the bitwise sum of the protected bits determined across all of the n sectors is zero;
   determining a bitwise sum of the protected bits across a portion of the n sectors when a failed sector is detected, wherein the portion of the n sectors includes all of the n sectors except for the failed sector; and
   recovering at least one portion of the failed sector utilizing the bitwise sum of the protected bits determined across the portion of the n sectors excluding the failed sector.

20. The method of claim 19, wherein the method further includes:
   recovering the failed sector when one failed sector is detected and the one or more sector errors are detected at one or more of the protected bits.

* * * * *